United States Patent
Delvigne et al.

(10) Patent No.: US 7,402,800 B2
(45) Date of Patent: *Jul. 22, 2008

(54) METHOD AND DEVICE FOR THE CONTINUOUS DETERMINATION OF DAMAGE TO SYSTEMS USED FOR THE POST-TREATMENT OF HEAT ENGINE EXHAUST GASES

(75) Inventors: Thierry Delvigne, Foyennes (BE); Jerome Obiols, Lyons (FR)

(73) Assignees: Total Fina Elf France, Puteaux (FR); Delta Services Industriels S.P.R.L., Froyennes (BE)

( * ) Notice: Subject to any disclaimer, the term of this patent is extended or adjusted under 35 U.S.C. 154(b) by 172 days.

This patent is subject to a terminal disclaimer.

(21) Appl. No.: 10/539,374

(22) PCT Filed: Dec. 16, 2003

(86) PCT No.: PCT/FR03/03738

§ 371 (c)(1), (2), (4) Date: Feb. 14, 2006

(87) PCT Pub. No.: WO2004/061406

PCT Pub. Date: Jul. 22, 2004

(65) Prior Publication Data

US 2006/0237640 A1    Oct. 26, 2006

(30) Foreign Application Priority Data

Dec. 16, 2002    (FR) ................................. 02 15906

(51) Int. Cl.
*G01N 7/00*    (2006.01)
*G01N 33/497*  (2006.01)
*G01N 33/26*   (2006.01)

(52) U.S. Cl. ................. 250/303; 250/301; 250/302; 250/356.2; 250/380; 250/381; 250/384; 701/101; 436/56; 436/57; 73/23.31; 73/53.05

(58) Field of Classification Search ................. 250/303
See application file for complete search history.

(56) References Cited

U.S. PATENT DOCUMENTS 2,957,986 A    10/1960    Quigg
(Continued)

FOREIGN PATENT DOCUMENTS

EP    0 269 300 A    6/1988
(Continued)

OTHER PUBLICATIONS

F.P.W. Wlnteringham, Half-life of Bromine-82, Nature 167 (1951) 155.*

(Continued)

*Primary Examiner*—David A. Vanore
*Assistant Examiner*—Bernard Souw
(74) *Attorney, Agent, or Firm*—Sughrue Mion, PLLC (57) ABSTRACT

The invention relates to a method for the continuous determination of the damage to at least one system (7) used for the post-treatment of exhaust gases from an internal combustion engine (2), caused by the lubricating oil, the fuel and/or at least one lubricating oil additive and/or fuel additive used. The inventive method consists in: (i) using a determined quantity of at least one radiotracer in order to modify the lubricating oil, the fuel and/or the additive for which the impact on the post-treatment system (7) is to be measured; (ii) measuring the quantity of radiotracer originating from the exhaust gases which has accumulated in the post-treatment system (7), said measurement being taken using a detector (10) which is sensitive to radiation emitted by the radiotracer that has accumulated in the post-treatment system (7); and (iii) transmitting the measurements taken by the detector (10) to a programmed computer (11) which can convert said measurements into the degree of damage caused to the post-treatment system by the lubricating oil, the fuel and/or the additive(s). The invention also relates to a device which is used to implement the inventive method.

15 Claims, 5 Drawing Sheets

U.S. PATENT DOCUMENTS

| | | | | |
|---|---|---|---|---|
| 3,471,696 | A * | 10/1969 | Moore et al. | 250/303 |
| 4,048,497 | A | 9/1977 | Fritzsche | |
| 4,092,541 | A * | 5/1978 | Neidl | 376/245 |
| 4,153,418 | A * | 5/1979 | Haas | 436/139 |
| 4,321,056 | A * | 3/1982 | Dimitroff | 436/43 |
| 4,338,520 | A * | 7/1982 | Stewart | 376/157 |
| 4,421,982 | A | 12/1983 | Potter et al. | |
| 4,626,692 | A * | 12/1986 | Furrer et al. | 250/432 R |
| 4,746,795 | A | 5/1988 | Stewart et al. | |
| 4,990,780 | A * | 2/1991 | Lee et al. | 250/343 |
| 5,067,455 | A * | 11/1991 | Okajima et al. | 123/196 R |
| 5,069,455 | A * | 12/1991 | Thomas | 473/279 |
| 5,117,680 | A * | 6/1992 | Colvin | 73/116 |
| 5,129,257 | A * | 7/1992 | Carduner et al. | 73/116 |
| 5,184,017 | A * | 2/1993 | Tury et al. | 250/343 |
| 5,223,712 | A * | 6/1993 | Adams et al. | 250/281 |
| 5,445,964 | A * | 8/1995 | Lee et al. | 436/60 |
| 6,114,700 | A * | 9/2000 | Blades | 250/343 |
| 6,227,038 | B1 * | 5/2001 | Blossfeld et al. | 73/49.7 |
| 6,230,545 | B1 * | 5/2001 | Adolph et al. | 73/31.05 |
| 6,294,389 | B1 * | 9/2001 | Vitale et al. | 436/57 |
| 6,715,473 | B2 * | 4/2004 | Ritchie et al. | 123/568.12 |
| 7,031,828 | B1 * | 4/2006 | Thompson et al. | 701/114 |
| 2004/0025853 | A1 * | 2/2004 | Ritchie et al. | 123/568.12 |
| 2005/0268692 | A1 * | 12/2005 | Delvigne et al. | 73/23.31 |
| 2006/0237640 | A1 * | 10/2006 | Delvigne et al. | 250/288 |
| 2007/0150161 | A1 * | 6/2007 | Dequenne | 701/101 |

FOREIGN PATENT DOCUMENTS

| | | |
|---|---|---|
| EP | 0 273 662 A2 | 7/1988 |
| EP | 0 636 771 A1 | 2/1995 |

OTHER PUBLICATIONS

A.H. Snell, "The Radioactive Isotopes of Bromine: Isomeric Forms of Bromine 80", Phys. Rev. 52 (1937) 1007-1022.*

J.R. Fromm, "The Detection of Ionizing Radiation", <http://www.3rd1000.com/nuclear/nuke101j.htm>.*

Wikipedia, "Neutron Activation Analysis", <http://en.wikipedia.org/wiki/Neutron_activation_analysis>.*

McMaster Nuclear Reactor, "What is Activation Analysis?" <http://www.science.mcmaster.ca/mnr/NAA-Page/naa.htm>.*

M.D. Glascock, "An Overview of Neutron Activation Analysis", <http://web.missouri.edu/~glascockm/naa_over.htm>.*

J.R. Fromm, "The Detection of Ionizing Radiation", Copyright 1997, <http://www.3rd1000.com/nuclear/nuke101j.htm>.*

Wikipedia, "Neutron Activation Analysis", Waybackmachine Mar. 17, 2004,<http://en.wikipedia.org/wiki/Neutron_activation analysis>.*

McMaster Nuclear Reactor, "What is Activation Analysis?", Waybackmachine Nov. 26, 2002, <http://www.science.mcmaster.ca/mnr/NAA-Page/naa.htm>.*

M.D. Glascock, "An Overview of Neutron Activation Analysis", Aug. 24, 2006, <http://web.missouri.edu/~glascockm/naa_over.htm>.*

* cited by examiner

METHOD AND DEVICE FOR THE CONTINUOUS DETERMINATION OF DAMAGE TO SYSTEMS USED FOR THE POST-TREATMENT OF HEAT ENGINE EXHAUST GASES

This application is a 371, National Stage of International Application No. PCT/FR03/003738, filed Dec. 16, 2003 and claims foreign priority under 35 U.S.C. § 119(a)-(d) or (f) of FR 02/15906, filed Dec. 16, 2002.

The present invention relates to a method and a device for the continuous determination of damage to systems for the post-treatment of heat engine exhaust gases. More specifically, the invention relates to the continuous monitoring of the effect of the lubricants and/or the fuels on the damage to such post-treatment systems.

These exhaust gas post-treatment systems, particularly systems for retaining particulates and/or for removing nitrogen oxides, carbon oxides and residual hydrocarbons, have become indispensable components of heat engines, in order to limit the releases that are harmful to the environment and, more particularly, to air quality.

However, the efficiency of a post-treatment system is not constant and decreases during its use, varying according to the type and quantity of combustion gases treated. In fact, some components of the gases tend to be fixed in the post-treatment system and thereby lower its efficiency.

In fact, the loss of efficiency of the post-treatment system can have such an impact on the operation of the engine as to reduce the performance thereof and increase the fuel consumption, particularly in the case of a damaged particulate filter.

The need has therefore been felt in the art, both among automotive vehicle manufacturers and lubricating oil, fuel and additive producers, to have a method and a device for the continuous measurement of the damage to post-treatment systems for internal combustion engines.

Research conducted by the applicant in this field has led to the development of a method and a device for the continuous determination of the damage to systems for the post-treatment of exhaust gases of a heat engine caused by the fuel, by the lubricating oil and/or by the additives present in the fuel and/or the lubricating oil, which do not require the assembly or disassembly of special devices and which can be put into practice easily, using simple and proven apparatuses.

More precisely, the method proposed by the present invention is designed to allow the continuous measurement of the impact of the lubricating oil, the fuel and/or the additives used, which are found as such or in the form of residual products in the exhaust gases, on the damage caused to heat engine post-treatment system(s).

Examples of residual products that may be mentioned in particular include traces of oil, fuel and/or additives, decomposition and combustion products of the oil and additives, and fuel combustion products.

In its principle, the invention consists in modifying the lubricating oil, the fuel and/or the additive(s) with a radiotracer, in order to measure, downstream of the engine, the radioactivity of the combustion gases that has accumulated in the post-treatment system, using a probe sensitive to ionizing radiation, in order to determine the quantity of residual products present and hence the degree of damage to said post-treatment system.

In consequence, the primary object of the invention is a method for the continuous determination of the damage to at least one system for post-treatment of the exhaust gases from an internal combustion engine, caused by the lubricating oil, the fuel and/or at least one lubricating oil additive and/or fuel additive used, characterized in that:

(i) a determined quantity of at least one radiotracer is used to modify the lubricating oil, the fuel and/or the additive for which the impact on the post-treatment system is to be measured;

(ii) a measurement is taken of the quantity of radiotracer originating from the exhaust gases which has accumulated in the post-treatment system, this measurement being taken using a detector which is sensitive to radiation emitted by the radiotracer that has accumulated in the post-treatment system;

(iii) the measurements taken by this detector are transmitted to a programmed computer which can convert these measurements into the degree of damage caused to the post-treatment system by the lubricating oil, the fuel and/or the additive(s).

The continuous application of this method offers many advantages which will emerge from the present description. Among these advantages, the inventive method allows in particular the easier determination of the service life of a post-treatment system as a function of the oil, the fuel and/or the additive used, and hence the anticipation of its replacement or its regeneration.

Moreover, the inventive method allows the simple and relatively rapid selection of the lubricants, fuels and/or additives best adapted to a given post-treatment system. A person skilled in the art can thus employ the method according to the invention to minimize the impact of residual products on the damage to the post-treatment systems and thereby prolong their service life.

The radiotracer used in the context of the invention is selected so that the quantity found in the post-treatment system is proportional to the quantity of oil, fuel and/or additive present in said system, as such or in the form of residual products. Thus the measured quantity of radiotracer that has accumulated in the post-treatment system accurately reflects the degree of damage caused by the lubricating oil, the fuel and/or the additive.

It should be observed that the quantity of radiotracer needed for effective monitoring depends in particular on the type of radiotracer (radiation type and energy), the positioning of the detector with respect to the post-treatment system, the geometry of the detector and of the post-treatment system, and of any screens or shieldings used.

With the exception of radiotracers marketed in radioactive form (hence by definition "radioactive" and not requiring activation), the radiotracer used in the inventive method is generally based on an activable species, that is to say an initially nonradioactive species requiring activation, which can be carried out before or after its mixing with the engine oil, the fuel or the additive. This activation can be carried out by neutrons, by radiation with a neutron source, or by a proton beam, using a particle accelerator, in appropriate conditions known to a person skilled in the art.

One feasible alternative for activation is to incorporate the species to be activated in an appropriate quantity of a vector (for example, a solvent or diluent such as a dilution oil, etc.), then to subject the mixture obtained to adequate activation and, finally, to mix it with the engine oil, the fuel, or the additive, which may be present in the oil or the fuel.

The radiotracer is necessarily selected so that its radiation is measurable, and it may be of a wide variety of types, according to whether it is incorporated in the lubricating oil or in the fuel.

A first embodiment of the inventive method relates to the monitoring of the impact of a determined lubricating oil additive Adh on the damage to a post-treatment system.

The radiotracer can be selected from at least one activable species EAhi, of which the composition is identical to that of the additive Adh. In this case, the quantity of activated EAhi species introduced into the oil substitutes for an identical quantity of the additive Adh, to avoid modifying the performance of the oil.

Other activable EAhii species may be used, different from the additives and having no effect on the properties of use of the oil, of which the quantity found in the post-treatment system remains correlated with the impact of the additive Adh.

The species EAhi and/EAhii which can be labeled are, in particular, elements such as zinc, bromine, sodium, molybdenum, phosphorus, sulfur, copper, calcium and magnesium, or products containing at least one of these elements.

As examples of activable EAhii species, of which the quantity found in the post-treatment system remains correlated with the impact of the additive Adh, mention may be made of strontium which, when incorporated in detergents containing calcium, for example calcium sulfonates, behaves like the element calcium in the post-treatment system and reflects the impact of the calcium on it.

Known products may also constitute the activable EAhi species, and these products include the usual families of lubricant additives known to a person skilled in the art, for example, zinc dithiophosphate, calcium sulfonates, magnesium sulfonates, calcium phenates, magnesium phenates, calcium salicylates, magnesium salicylates, etc.

A second embodiment of the inventive method relates to the monitoring of the impact of the engine lubricating oil on the damage to a post-treatment system.

In this embodiment, the radiotracer incorporated in the oil is selected from among the activable EHi species selected by a person skilled in the art so that the quantity found in the post-treatment system is proportional to the impact of the oil on said system (examples: traces of oils and combustion and decomposition products thereof).

According to a first advantageous variant, the activable EHi species which can be labeled are selected from the activable EAhi and/or EAhii species already mentioned. In this case, the radioactivity measured in the post-treatment system may also reflect the impact of the oil, the impact of a given Adh additive of the oil, or both simultaneously. As previously, for the first embodiment, the quantity of activated EAhi species introduced into the oil substitutes for an identical quantity of oil additive Adh.

According to a second variant, other activable EHi species having no effect on the properties of use of the oil can be used, of which the quantity accumulated at the outlet of the exhaust gases remains correlated with the engine oil consumption.

Examples of these activated EHi species which may be mentioned include the isotopes of halogens, such as for example fluorine-18 and bromine-82, germanium-68, germanium-69 and technetium 99-m.

These EHi elements may be used alone or in the form of products containing said element and may be incorporated therein within a vector. For example, technetium 99-m can be incorporated in the oil in the form of an aqueous solution of sodium pertechnetate $NaTcO_4$.

Technetium 99-m can also be used, in the form of nanoscale particles isolated from the atmosphere by carbon. One such product is marketed under the brand Technégaz which is commonly used for the clinical analysis of lung ventilation.

Germanium-68 and germanium-69 can be added to the lubricating oil, for example in the form of tetraalkyl-germanes containing at least one of these isotopes.

A third embodiment of the inventive method relates to the monitoring of the impact of a given Adc additive for fuel (gasoline or diesel) on the damage to a post-treatment system.

The radiotracer can be selected among at least one activable EAci species, of which the composition is identical to that of the additive Adc. In this case, the quantity of EAci species introduced into the oil substitutes for an identical quantity of Adc additive in order to avoid modifying fuel performance.

Other activable EAcii species having no effect on the properties of use of the fuel can also be used, of which the quantity found in the post-treatment system remains correlated with the impact of the Adc additive on the post-treatment system.

These other EAcii species suitable for use are, for example, the EAhii species already mentioned as radiotracers for monitoring the impact of lubricant additives.

The EAci and/or EAcii species which can be labeled are, for example, the following elements: manganese, cerium, potassium, barium and calcium, as well as products containing at least one of these elements.

A fourth embodiment of the inventive method relates to the monitoring of the impact of the fuel on the damage to a post-treatment system.

In this variant, the radiotracer incorporated in the fuel is selected from among the activable ECi species, these species being selected by a person skilled in the art so that the quantity found in the post-treatment system is proportional to the impact of the fuel on said system.

The ECi species which can be labeled are advantageously selected from the activable EAci species already mentioned above with respect to monitoring the impact of the fuel additives, or from the activable EAcii species, which can be used for the same purpose, without impact on the fuel properties.

In this case, the radioactivity measured in the post-treatment system may also reflect the impact of the fuel, the impact of a given Adc additive, or advantageously both simultaneously.

However, other ECii species without any impact on the properties of use of the fuel can also be used, of which the quantity that has accumulated at the outlet of the exhaust gases remains correlated with the impact of the fuel on the post-treatment system. Examples of these species again include the isotopes of halogens such as, for example, bromine-82 and fluorine-18, germanium-68, germanium-69 and technetium 99-m.

These radioactive elements may be used alone or in the form of products containing the element concerned, and can be incorporated therein within a vector. For example, technetium 99-m can be incorporated in the fuel in the form of an aqueous solution of sodium pertechnetate $NaTcO_4$ or in the form of namometric particles isolated from the atmosphere by carbon.

To simplify the removal of the radiotracers accumulated in the post-treatment system, it is preferable to use short-lived radioelements such as bromine-82, germanium-69 or technetium 99-m. However, species comprising more conventional radioactive elements, such as Sr, Zn, Ca, S, P, and Mg, can be used by employing appropriate removal methods, for example, trapping downstream of the post-treatment system(s).

The post-treatment systems of an internal combustion engine of which the degree of damage associated with the type of fuel, lubricant and/or additive(s) used is to be measured, may be of various types. The main types concerned in connection with the invention are:

(i) one-way or two-way oxidation catalyst systems for diesel engines (reduction of CO and/or hydrocarbons) and three-way oxidation catalyst systems for gasoline engines (reduction of CO, nitrogen oxides $NO_x$ and hydrocarbons), (ii) systems for removing $NO_x$ ($NO_x$ trap or catalyst for reducing $NO_x$), (iii) and particulate filter systems (catalyzed or not).

For example, the particulate filters of one of the currently developed technologies comprise at least one filtration element consisting of a filter medium with a porous structure, fixed in a metal housing, which is connected to the exhaust gas line. The filter medium placed in the metal housing of the filter (called "canning") may consist of porous ceramic elements. The filter medium is traversed by the exhaust gases between an inlet end and an outlet end of the filter, and it can retain the particles of radiotracers of the residual products present in the exhaust gases.

It should be observed that the detector of the radiotracer particles that have accumulated in the post-treatment system may be advantageously placed adjacent to the system, thereby considerably facilitating the measurements.

This detector is a probe for detecting ionizing radiation (beta, X- or gamma rays) which may be of the liquid or solid scintillator type [sodium iodide NaI(Tl) crystal, BGO crystal] or of the semiconductor type [germanium crystal, CZT crystal].

These types of detector allow the continuous application of the method according to the invention, and the data can be acquired in a very short time, of the order of one second.

It should further be observed that the detector can simultaneously detect the presence of various tracers modifying the oil, the fuel or the additive(s), as well as their respective quantities in the combustion gases; this makes it possible to correlate the quantity of each of the radiolabeled species with the impact of the oil, the fuel and/or the additive(s) on the post-treatment system.

The signals detected are then processed by a series of means for calculating the impact of the lubricating oil, the fuel and/or the additive. These means comprise in particular means for processing the signal detected (for example with amplifier, filter and analog-to-digital converter ADC), means for analyzing the pulse heights (for example a multichannel analyzer) and means for storing and processing the data acquired (for example, a PC type computer).

A further subject of the invention is a device for the continuous determination of the damage to at least one system for the post-treatment of exhaust gases of an internal combustion engine, caused by the lubricating oil, the fuel and/or at least one lubricating oil additive and/or fuel additive used, this device comprising means for incorporating a determined quantity of at least one radioactive tracer in the lubricating oil or in the fuel, and, downstream of the engine, at least one system for the post-treatment of the combustion gases originating from the engine, this device being characterized in that it comprises:

(i) a detector sensitive to the radiation emitted by the radioactive tracer, installed near the post-treatment system and at some distance therefrom, in order to measure a radiation emitted by the tracer particles that have accumulated in this system;

(ii) functionally linked to the detector, a programmed computer which can convert the measurements taken by the detector into the degree of damage caused to the post-treatment system by the lubricating oil, the fuel and/or the additives.

The post-treatment system subject to damage by the residual products of the lubricating oil, the fuel and/or the additives, can be placed downstream of the engine, in any position enabling it to be in contact with the combustion gases. It may accordingly be positioned on the engine exhaust gas line.

The engine may be coupled with a plurality of post-treatment systems. For example, a diesel engine may comprise a two-way oxidation catalyst system and a particulate filter, and a gasoline engine may comprise a three-way catalyst system and an $NO_x$ removal system.

Before the exhaust gases are released into the atmosphere, if the post-treatment system is not itself a particulate filter, such a filter must necessarily be provided downstream of this system, on the exhaust line, in order to trap the remaining radioactive species.

BRIEF DESCRIPTION OF THE DRAWINGS

The drawings appended hereto illustrate the putting into practice of the invention. In these drawings.

Figure 1:
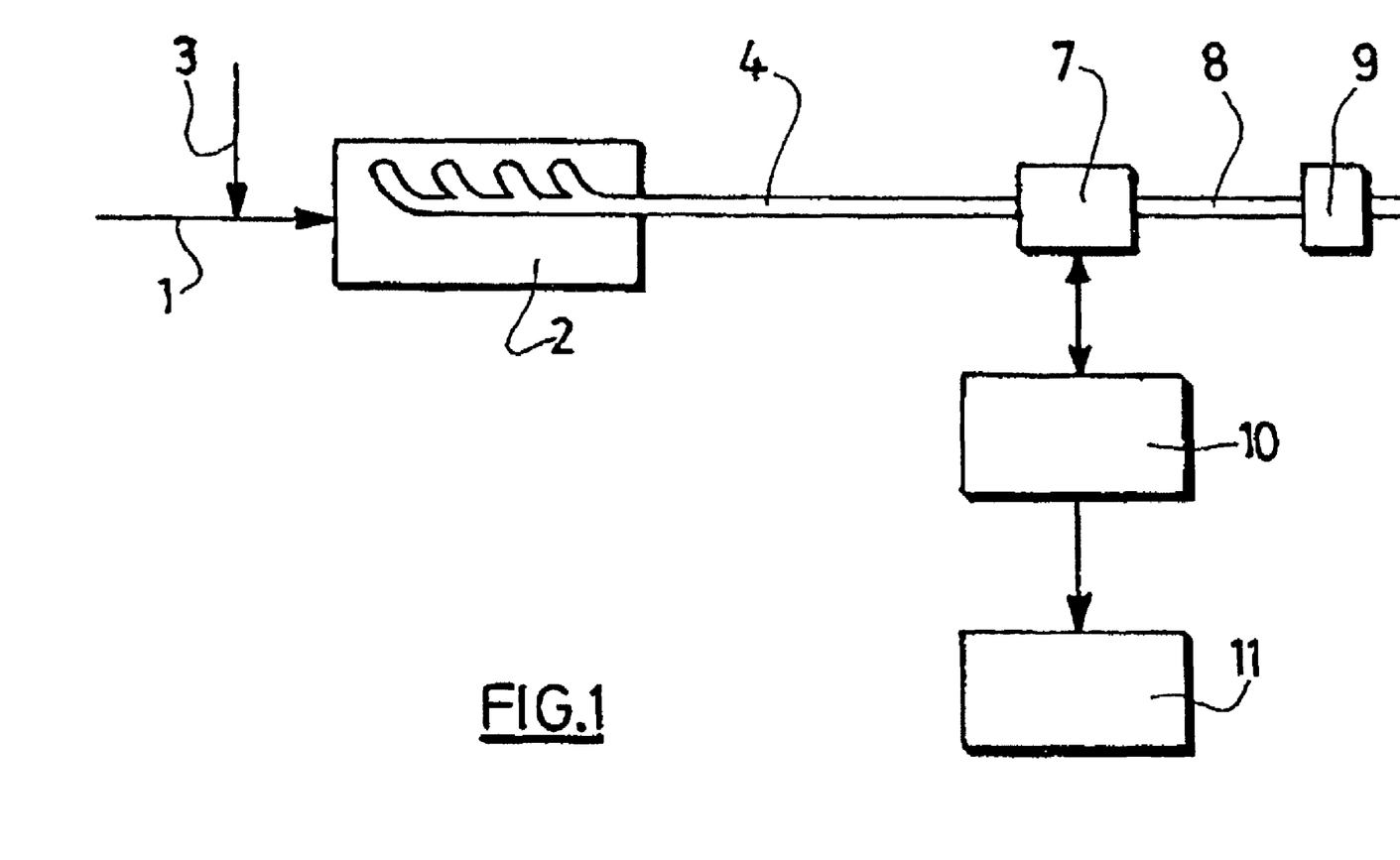
FIG. 1 is a schematic view showing the putting into practice of the invention method.

Let us first refer to FIG. 1.

In this embodiment, as a bypass to the lubricating oil circuit 1 of the internal combustion engine 2, a line 3 is provided for introducing a predetermined quantity of the same lubricating oil comprising at least one radioactive tracer.

The combustion products from the engine 2 are removed via the line 4 to an exhaust gas post-treatment system 7, which may be of any of the types mentioned above, and in which the particles of the radioactive tracer present in the exhaust gases can be deposited.

Before being removed to the exterior via the line 8, these gases pass through a particulate filter 9, which is suitable for retaining the last radioactive particles present before the gases are released into the atmosphere.

Immediately adjacent to the system 7 is provided a probe 10 for detecting ionizing radiation, which is used for the continuous measurement of the quantity of radiotracer particles incorporated in the lubricating oil, present in the system 7.

The measurements taken by the probe 10 are transmitted to a computer 11, which can convert these measurements into the degree of damage to the post-treatment system 7 caused by the lubricating oil.

As described above, the radiotracer used in the lubricating oil is preferably a short-lived radioactive compound, particularly technetium-99 m.

The examples below, which are nonlimiting, illustrate the putting into practice of the invention and the advantages thereof.

EXAMPLE 1

In this example, the damage to two distinct post-treatment systems placed on the exhaust line of a four-stroke heat engine is determined continuously.

The impact of a lubricating oil additive labeled by neutron activation is analyzed here.

The engine used in these tests is a Honda (registered trade mark) motorcycle engine, known by the trade name Hornet, displacement 600 cm³. To shorten the testing time, the engine was configured so that its oil consumption was about 1 liter/hour at a speed of 6000 rpm, the oil consumption of the original engine being very low.

The four-stroke engine oil is a motorcycle oil marketed by the ELF brand, type 4 DXRatio.

The activated additive is a secondary DTPZn (zinc DiThio-Phosphate), irradiated for several hours in a stream of thermal neutrons. The reaction converts part of the stable Zn-64 to radioactive Zn-65 ($^{65}$Zn).

The final oil is prepared by blending all the additives, including the labeled additive, according to the manufacturers specifications. The specific activity of the reconstituted oil is 240 kBq/liter.

The following post-treatment systems are used:
  an PF type particulate filter available on the market, designed for the PSA 2.2 liter HDI engine;
  an oxidation catalyst available on the market, installed on a Peugeot or Citroen vehicle equipped with the 1.4 liter HDI engine.

These two elements were placed in series at the engine outlet, the oxidation catalyst being installed upstream of the PF (see FIG. 1).

The gamma radiation detection systems were installed near the post-treatment systems, in order to continuously measure the accumulation of the labeled element (zinc-65) therein. These are standard sodium iodide NaI(Tl) detectors measuring 7.62×7.62 cm (3×3 inches) with built-in photomultiplier tube, the other elements of the measurement circuit being a Canberra brand model 2007P load preamplifier, a 2020 spectroscopy amplifier (Canberra), a model 8087 ADC converter (Canberra), and a model S100 multichannel card (Canberra).

The software used in these tests includes the "Genie 2000" (Canberra) software for gamma spectrometry and the MCS (multichannel sampling) analysis software "IDSWear" marketed by Atlantic Nuclear Services (ANS), Canada. This software is used to monitor the variation over time of the counting rate of each detector in preset energy windows (in this case the 1115 keV zinc-65 peak in connection with the tests performed).

Figure 2:
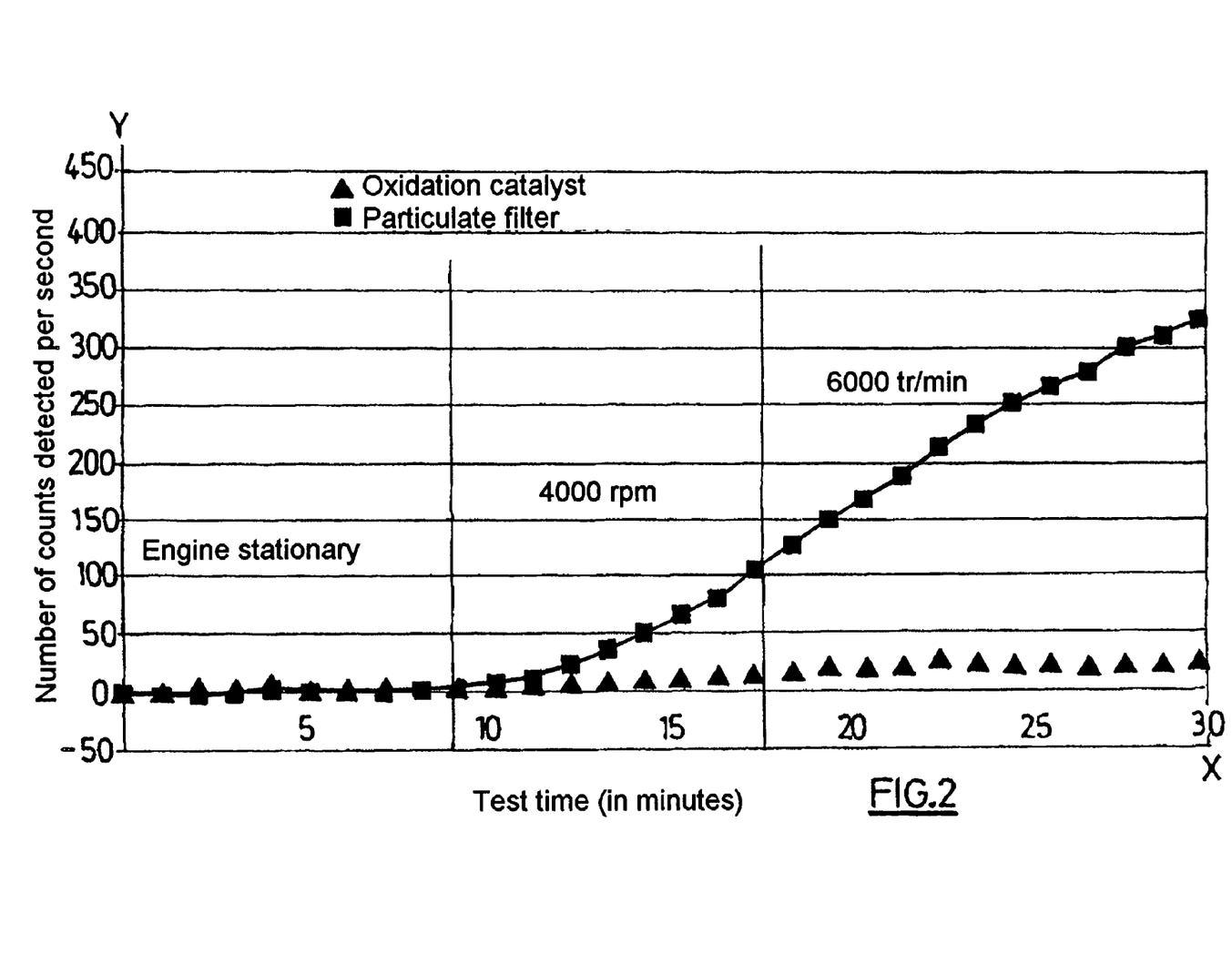
FIG. 2 is a diagram showing embodiments that are described below.

FIG. 2 shows the accumulation of zinc-65 in the two post-treatment systems during the tests. The engine, uncontaminated and supplied with unactivated gasoline, was started at time t=10 minutes and run at various speeds (4000 and 6000 rpm).

The x-axis shows the test time in minutes and the y-axis shows the number of gamma rays detected per second (counts/sec) in the oxidation catalyst and the particulate filter.

It may be observed that the increase in activity is much greater in the particulate filter (about 16 times higher), and this may be explained by the very different concepts of the two post-treatment systems:
  in the case of the oxidation catalyst, the poisoning results from a deposit of zinc-65 on the catalyst walls (of which the negative effect is a chemical deactivation),
  for the particulate filter, the poisoning results from trapping in the walls of the filter (which can cause an accumulation of ash and thereby cause clogging), the filter offering an excellent trapping efficiency for very small particles.

At a speed of 6000 rpm, an increase in the counting rate of 220 counts/second is observed in the particulate filter after 12 minutes at this speed. By considering that the PF retains about 95% of the zinc-65 emitted, and taking account of the detection geometry and efficiency of the counting circuit for the radiation emitted by the $^{65}$Zn (about 0.4%), an engine emission rate of about 290 kBq per hour can thus be calculated, corresponding to the passage of about 1.2 liters of oil per hour through the filter. This result is consistent with the actual consumption of the engine.

It should also be observed that the oxidation catalyst has retained about 6% of the $^{65}$Zn load released by the engine.

This example hence clearly demonstrates the feasibility of the method according to the invention for the continuous monitoring of the damage to post-treatment systems of relatively simple technology (chemical deactivation of oxidation catalyst) or complex technology (catalyst in series with a particulate filter).

EXAMPLE 2

This example relates to the monitoring of the accumulation of ash residues originating from the lubricant in a diesel post-treatment system of the particulate filter type.

Based on a sample of DTPZn activated by neutron irradiation (containing zinc-65), of which the specific activity is 95 kBq/ml, and using a test oil sample in which strontium-85 has been incorporated in the detergent (calcium sulfonate), 50 liters of oil are prepared having a specific activity of 21.2 kBq/l of Zn-65 and 10.47 kBq/l of Sr-85 (the strontium being added during the test).

The oil thus labeled is introduced into the casing of the 2.2 L turbodiesel engine of a Renault Laguna, equipped with an exhaust particulate filter. The vehicle, installed on a roller bench, undergoes preprogrammed cycles of 471 km, selected so as to promote the consumption of oil by the engine.

The engine used is uncontaminated and is supplied with unactivated fuel. Six oil changes were carried out after 10 000 km, and one oil change was carried out after 20 000 km. For technical reasons, the strontium-85 tracer was only added after 60 000 km of travel. At 5000 km intervals, the particulate filter was dismantled after a regeneration phase which allowed the combustion of all the organic residues, and was weighed. Since the initial mass of the filter is known, the mass of accumulated inorganic residues (called ash residues) is calculated. The zinc-65 and Sr-85 activity of the filter is also measured, the detection system being similar to the one described in example 1.

Figure 3:
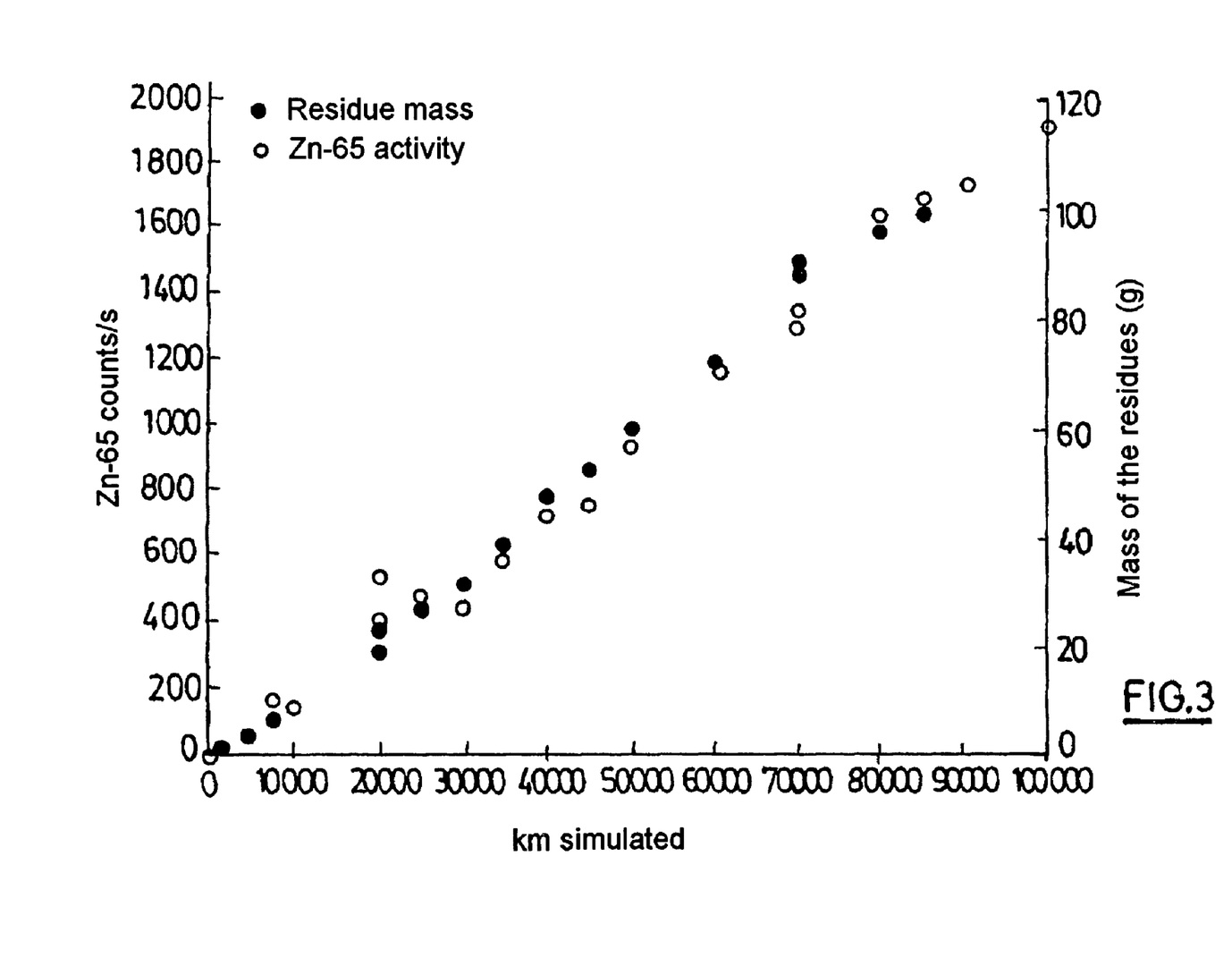
FIG. 3 shows the monitoring of the accumulation of ash residues in the filter and the accumulation of the Zn-65 in the filter.

FIG. 3 shows the monitoring of the accumulation of ash residues in the filter (circles) and the monitoring of the accumulation of Zn-65 in the filter (dots) as a function of the mileage of the vehicle.

Figure 4:
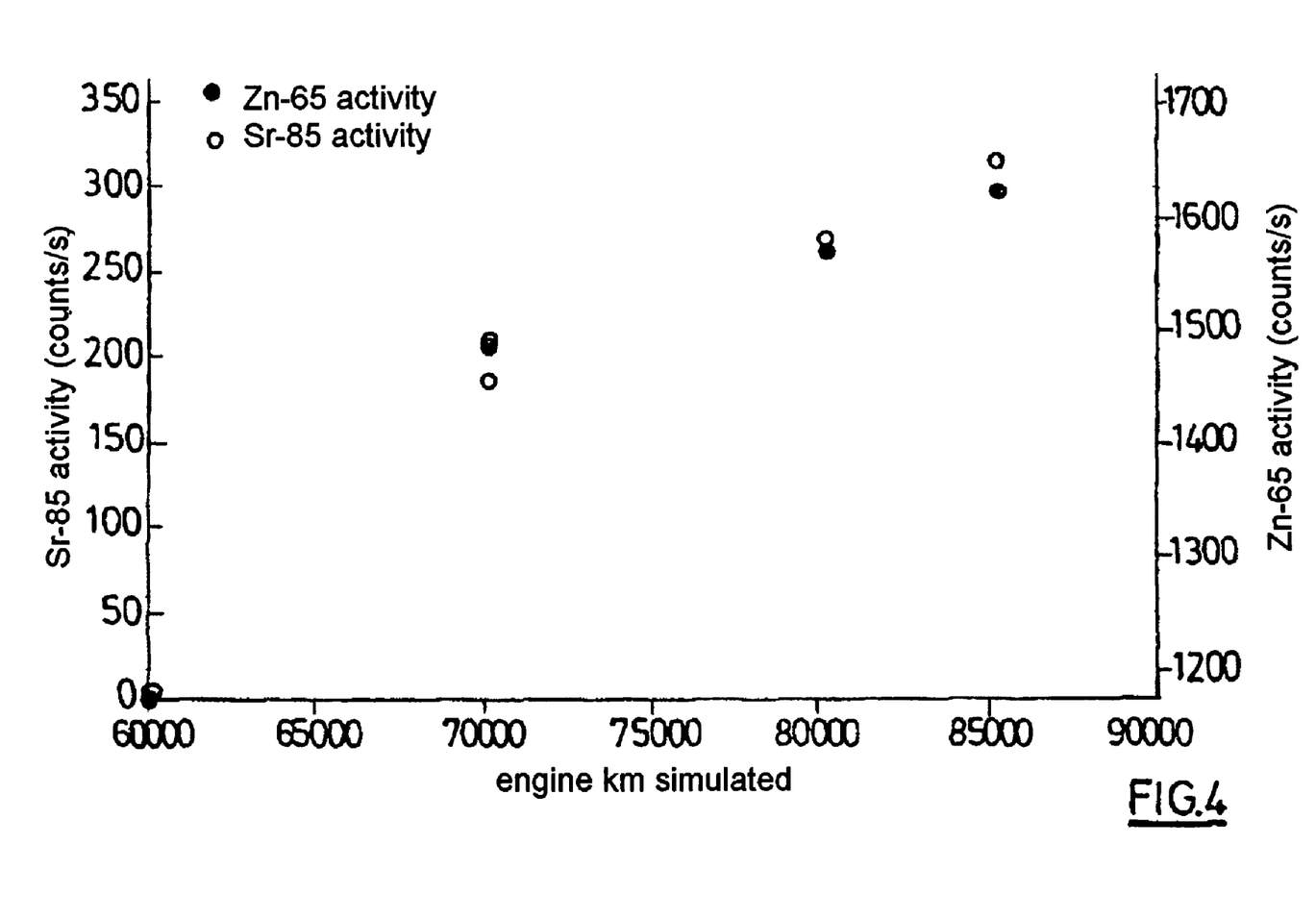
FIG. 4 shows the monitoring of the accumulation in the filter of Zn-65 and Sr-85.

FIG. 4 shows the monitoring of the accumulation in the filter of Zn-65 (dots) and of Sr-85 (circles) as a function of the mileage of the vehicle. Considering the chemical form of the Zn-65 and the Sr-85 described above in this example, this serves to demonstrate the fact that the zinc from the DTPZn and the calcium from the detergents have accumulated in identical proportions in the particulate filter (none of these components has accumulated preferentially in the filter).

Figure 5:
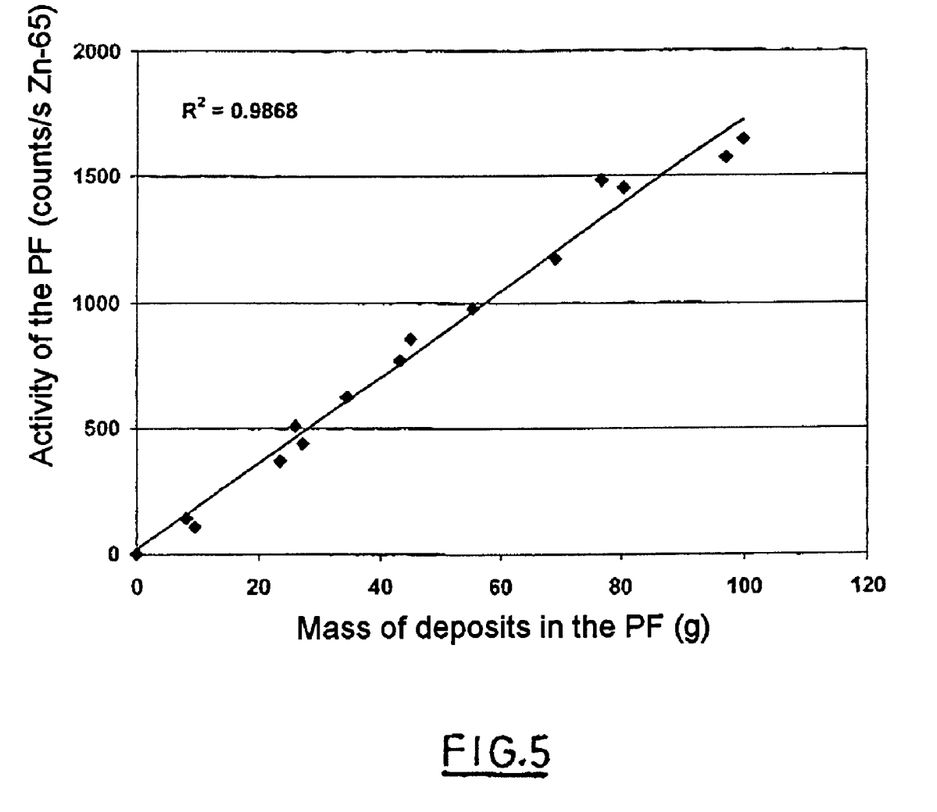
FIG. 5 shows the relation between the mass of ash residues accumulated in the filter and the Zn-65 activity of the same filter during the running of the vehicle.

FIG. 5 shows the relation between the mass of ash residues accumulated in the filter and the Zn-65 activity of the same filter during the running of the vehicle. This example hence clearly demonstrates that the monitoring of the accumulation of Zn-65, used in activated DTPZn form, in the particulate filter, is representative of the accumulation of ash residues in the particulate filter produced by the combustion of the oil.

Since the activity in the particulate filter can be measured continuously, it is therefore possible to determine continuously, and accurately, even over short periods, the damage to the particulate filter caused by the accumulation of ash residues produced by the combustion of the lubricant.

The invention claimed is:

1. A method for the continuous determination of the damage to at least one system for post-treatment of the exhaust gases from an internal combustion engine caused by the lubricating oil, the fuel and/or at least one lubricating oil additive and/or fuel additive used, wherein:
   (i) a determined quantity of at least one radiotracer is used to modify the lubricating oil, the fuel and/or the additive for which the impact on the post-treatment system is to be measured;
   (ii) a measurement is taken of the quantity of radiotracer originating from the exhaust gases which has accumulated in the post-treatment system, this measurement being taken using a detector which is sensitive to radiation emitted by the radiotracer that has accumulated in the post-treatment system and wherein the detector is placed adjacent to the system to allow a continuous measurement of the emitted radiation while the engine is in use;
   (iii) the measurements taken by this detector are transmitted to a programmed computer which can convert these measurements into the degree of damage caused to the post-treatment system by the lubricating oil, the fuel and/or the additive(s).

2. The method as claimed in claim 1, wherein the lubricating oil, the fuel and/or the additive for which the impact is to be measured, is modified with a determined quantity of at least one radiotracer comprising Sr, Zn, Ca, S, P and/or Mg.

3. The method as claimed in claim 1, wherein the lubricating oil, the fuel and/or the additive for which the impact is to be measured, is modified with a determined quantity of at least one radiotracer comprising a short-lived radioactive element, particularly bromine 82, germanium-69 or technetium 99-m.

4. The method as claimed in claim 3, wherein the technetium 99-m is incorporated in the oil or the fuel in the form of an aqueous solution of sodium pertechnetate $NaTcO_4$.

5. The method as claimed in claim 3, wherein the germanium-69 is incorporated in the oil or the fuel in the form of tetraalkylgermane.

6. The method as claimed in claim 1 or 2, wherein the radiotracer is activated by neutrons and/or by a proton beam before incorporation in this oil.

7. The method as claimed in claims 1 or 2, characterized in that the continuous determination of the damage to at least one system for post-treatment of exhaust gases of an internal combustion engine, caused by a lubricating oil additive Adh, is carried out by introducing into the lubricating oil a quantity of activable EAhi species of identical composition to the additive Adh and substituting for an identical quantify of the additive Adh.

8. The method as claimed in claims 1 or 2, wherein the continuous determination of the damage to at least one system for post-treatment of exhaust gases of an internal combustion engine, caused by a lubricating oil additive Adh, is carried out by introducing into the lubricating oil a quantity of activable EAhii species, having no effect on the properties of use of the oil, of which the quantity found and measured in the post-treatment system is correlated with the impact of the additive Adh.

9. The method as claimed in claim 8, wherein the additive Adh is a detergent containing calcium and wherein the EAhii species in activated form is strontium-85.

10. The method as claimed in claims 1 or 2, wherein the continuous determination of the damage to at least one system for post-treatment of exhaust gases of an internal combustion engine, caused by the fuel, is carried out by introducing into the fuel a quantity of activable EAci species of identical composition to a fuel additive Adc and substituting for an identical quantity of said additive Adc in the fuel.

11. The method as claimed in claims 1 or 2, wherein the continuous determination of the damage to at least one system for post-treatment of exhaust gases of an internal combustion engine, caused by the lubricant, is carried out by introducing into the lubricating oil a quantity of an activable EAhi or EAhii species.

12. A device for the continuous determination of the damage to at least one system for the post-treatment of exhaust gases of an internal combustion engine, caused by the lubricating oil, the fuel and/or at least one lubricating oil additive and/or fuel additive used, this device comprising means for incorporating a determined quantity of at least one radioactive tracer in the lubricating oil or in the fuel, and, downstream of the engine, a system for the post-treatment of the combustion gases originating from the engine, comprising:
   (i) a detector sensitive to the radiation emitted by the radioactive tracer, installed near the post-treatment system and at some distance therefrom, in order to measure a radiation emitted by the tracer particles that have accumulated in this system and wherein the detector is placed adjacent to the system to allow a continuous measurement of the emitted radiation while the engine is in use;
   (ii) functionally linked to the detector, a programmed computer which can convert the measurements taken by the detector into the degree of damage caused to the post-treatment system by the lubricating oil, the fuel and/or the additives.

13. The device as claimed in claim 12, wherein the post-treatment system is selected from the group of oxidation catalyst systems, systems for removing or reducing carbon oxides, and particulate filter systems.

14. The device as claimed in claims 12 or 13, wherein the detector is a probe for detecting ionizing radiation.

15. The device as claimed in claims 12 or 13, wherein it comprises a filter placed on the combustion gas exhaust line, between the post-treatment system and the point at which these gases are released into the atmosphere.

* * * * *